United States Patent
Machida et al.

(10) Patent No.: US 7,758,260 B2
(45) Date of Patent: Jul. 20, 2010

(54) BARRIER DEVICE

(75) Inventors: Takuya Machida, Tokyo (JP); Kiyoshi Toma, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 167 days.

(21) Appl. No.: 12/232,419

(22) Filed: Sep. 17, 2008

(65) Prior Publication Data
US 2009/0074400 A1    Mar. 19, 2009

(30) Foreign Application Priority Data
Sep. 19, 2007   (JP)   ............... 2007-242079

(51) Int. Cl.
*G03B 9/08*   (2006.01)
(52) U.S. Cl. ..................... 396/448; 396/452
(58) Field of Classification Search ........... 396/448
See application file for complete search history.

(56) References Cited
U.S. PATENT DOCUMENTS
2002/0172519 A1*  11/2002  Takahashi et al. ......... 396/486
2007/0195185 A1*  8/2007  Onuki ................ 348/333.02
2008/0259200 A1*  10/2008  Matsumoto ............ 348/340

FOREIGN PATENT DOCUMENTS
JP   2005-173104   6/2005
JP   2005-189278   7/2005

* cited by examiner

*Primary Examiner*—W. B. Perkey
*Assistant Examiner*—Dennis Hancock
(74) *Attorney, Agent, or Firm*—Wenderoth, Lind & Ponack, L.L.P.

(57) ABSTRACT

A barrier device of the present invention includes a cover defining a front aperture, a base defining a rear aperture, an annular gap formed between a rear end face of the front aperture and a front end face of the rear aperture, a barrier member movably provided through the gap between a closed position and an opened position, and a seal member sealing the gap. The seal member is provided over an entire circumference of the clearance and formed such that, when the barrier member is in the opened position, the seal member seals the gap with a part thereof being in contact with the barrier member, and when the barrier member is in the closed position, the seal member deforms to make contact with a surface of the barrier member. This enables the barrier member to open and close smoothly, and reliably prevents penetration of dirt, dust, moisture or the like through the gap.

7 Claims, 16 Drawing Sheets

BARRIER DEVICE

BACKGROUND OF THE INVENTION

1. Field of the Invention

The present invention relates to a barrier device having a barrier member that can close an aperture in a portable digital camera or a camera unit mounted in a mobile phone or the like for protecting a lens or an ND filter when not in use. More particularly, the invention relates to a barrier device having a function to prevent penetration of dust, moisture or the like through a gap in the aperture area, which is provided for allowing movement of the barrier member.

2. Description of the Related Art

A known conventional barrier device includes a head cover defining a generally rectangular aperture for exposing a lens, a wall portion forming a retraction space on the backside of the head cover, a pair of barrier members disposed in the retraction space such as to be able to reciprocate within a plane orthogonal to an optical axis of the lens for closing the aperture when closed and opening the aperture when opened, and a dust/moisture protection member (seal member) shutting the retraction space along an upper and lower edge of the generally rectangular aperture (for example, see Japanese Unexamined Patent Publication No. 2005-173104).

This dust/moisture protection member is formed of a thin flexible material such as vinyl, rubber or the like. A torsion spring applies a force to keep it constantly biased such that it is pressed against the surface of the pair of barrier members when the barrier members close the aperture while it is pressed against the wall portion when the barrier members open the aperture.

However, this dust/moisture protection member is designed to shut the upper and lower edges of the substantially rectangular aperture, i.e., it does not shut the entire circumference of the aperture (including the left and right edges). There is thus a risk that dust, moisture or the like may penetrate through the left or right side of the aperture into the interior of the device.

Moreover, the dust/moisture protection member is constantly pressed against the surface of the pair of barrier members or the surface of the wall portion by a biasing force of the torsion spring. While the dust/moisture protection member has a linear shape, the pair of barrier members slides in a direction orthogonal to the dust/moisture protection member, because of which slide resistance is large when the pair of barrier members performs the open/close operation, and there is also a risk that the pair of barrier members may stick to the dust/moisture protection member and cannot perform the open/close operation smoothly.

Another problem is that since the dust/moisture protection member is formed of vinyl or rubber, it tends to aggravate the increase in the slide resistance and friction between the pair of barrier members and the dust/moisture protection member. Moreover, since the dust/moisture protection member is biased by the torsion spring, the structure is complex with a large number of components, which leads to a cost increase.

SUMMARY OF THE INVENTION

In view of the above circumstances the present invention has been accomplished, an object of the present invention is to provide a barrier device that can allow the barrier member to move smoothly and prevent penetration of dirt, dust, moisture or the like through a gap (clearance) in the aperture while achieving simplification of the structure and a reduction in cost.

To achieve the above object, the present invention provides a barrier device, including a cover defining a front aperture; a base joined with a backside of the cover and defining a rear aperture; an annular gap formed between a rear end face of the front aperture and a front end face of the rear aperture; a barrier member provided such as to be freely movable through the gap between a closed position where the barrier member faces the front aperture and the rear aperture and an opened position where the barrier member is retracted from the front aperture and the rear aperture; and a seal member sealing the gap. The seal member is provided over an entire circumference of the gap and formed such that, when the barrier member is in the opened position, the seal member seals the gap with a part thereof being in contact with the barrier member, and when the barrier member is in the closed position, the seal member deforms to make contact with a surface of the barrier member.

With this structure, when the barrier member enters the gap to be in the closed position, the seal member deforms by an amount corresponding to a thickness of the barrier member and seals the gap in closely contact with the surface of the barrier member. On the other hand, when the barrier member retracts from the gap to be in the opened position, the seal member seals the gap with a part thereof being in contact with an outer edge region of the barrier member (including a condition in which the seal member is partly deformed by the contact).

The seal member is thus capable of sealing the gap over its entire circumference as well as deformable such as to allow the open/close operation of the barrier member, thereby ensuring that the barrier member can open and close smoothly, and that dirt, dust, moisture or the like is prevented from penetrating through the gap (clearance) in the aperture. In particular, since a part of the seal member is in contact with the barrier member when the barrier member is in its opened position, the barrier member is prevented from colliding and getting stuck with the seal member when moving toward its closed position. This enables the barrier member to smoothly move toward the closed position and to reliably seal the gap.

In the above structure, an adoptable configuration is that the seal member is formed annular, arranged between the rear end face of the front aperture and the front end face of the rear aperture, and secured to either one of the rear end face and the front end face.

With this configuration, the seal member is simply an annular component secured to the rear end face or the front end face, and therefore simplification of the structure and a reduction in cost are achieved.

In the above structure, an adoptable configuration is that the seal member is formed tubular extending along an inner circumferential face of the front aperture to a position where the seal member seals the gap.

With this configuration, the seal member is simply a tubular component secured to the inner circumferential face of the front aperture and arranged to seal the gap, and therefore simplification of the structure and a reduction in cost are achieved, as well as the dust/moisture protection effect is further enhanced.

In the above structure, an adoptable configuration is that the seal member includes a front seal member formed annular and secured to the rear end face of the front aperture, and a rear seal member formed annular such as to face opposite and in closely contact with the front seal member and secured to the front end face of the rear aperture.

With this configuration, the front seal member and the rear seal member are arranged coaxially along the axial line direction of the aperture relative to the gap in closely contact with and opposite each other. Therefore, when the barrier member is in the opened position, they seal the gap in cooperation with each other, while when the barrier member is in the closed position, they respectively deform so as to allow movement of the barrier member and respectively make contact with both sides of the barrier member to seal the gap. Therefore, they can deform more easily than a single seal member and allow the barrier member to perform the open/close operation more smoothly, and also, the seal members can have higher durability.

In the above structure, an adoptable configuration is that the seal member includes an inner seal member formed annular, arranged between the rear end face of the front aperture and the front end face of the rear aperture, and secured to either one of the rear end face and the front end face, and an outer seal member formed annular, arranged between the rear end face of the front aperture and the front end face of the rear aperture and spaced apart from the inner seal member on a radially outer side thereof, and secured to either one of the rear end face and the front end face.

With this configuration, the inner seal member and the outer seal member are arranged concentrically in the radial direction of the aperture relative to the gap. Therefore, when the barrier member is in the opened position, they respectively seal the gap, while when the barrier member is in the closed position, they respectively deform so as to allow movement of the barrier member and respectively make contact with one side of the barrier member to seal the gap. Thus a sealing effect similar to "labyrinth" effect is achieved, which increases the sealing effect as compared with a single seal member, and prevents penetration of dirt, dust, moisture or the like more reliably.

In the above structure, an adoptable configuration is that the seal member is formed of a brush material or sponge.

With this configuration, since the seal member is formed of a brush material or sponge, it can reliably seal the gap in a non-deformed state in which no deforming or biasing force is applied from outside. On the other hand, the seal member can easily deform to receive the barrier member when a part thereof is in contact with the barrier member or when the barrier member is entering the gap. Accordingly, the sealing effect is further enhanced, and the open/close operation of the barrier member is performed more smoothly.

In the above structure, an adoptable configuration is that the barrier member is provided such as to be freely swingable relative to the base, the base is provided with an electromagnetic actuator for driving the barrier member to open and close.

With this configuration, the barrier member is driven to open and close by a drive force of the electromagnetic actuator. Since penetration of moisture or the like through the gap is reliably prevented, the electric wiring or the like is protected from moisture, whereby functional reliability is increased.

DETAILED DESCRIPTION OF THE PREFERRED EMBODIMENTS

Preferred embodiments of the present invention will be hereinafter described with reference to the attached drawings.

Figure 1:
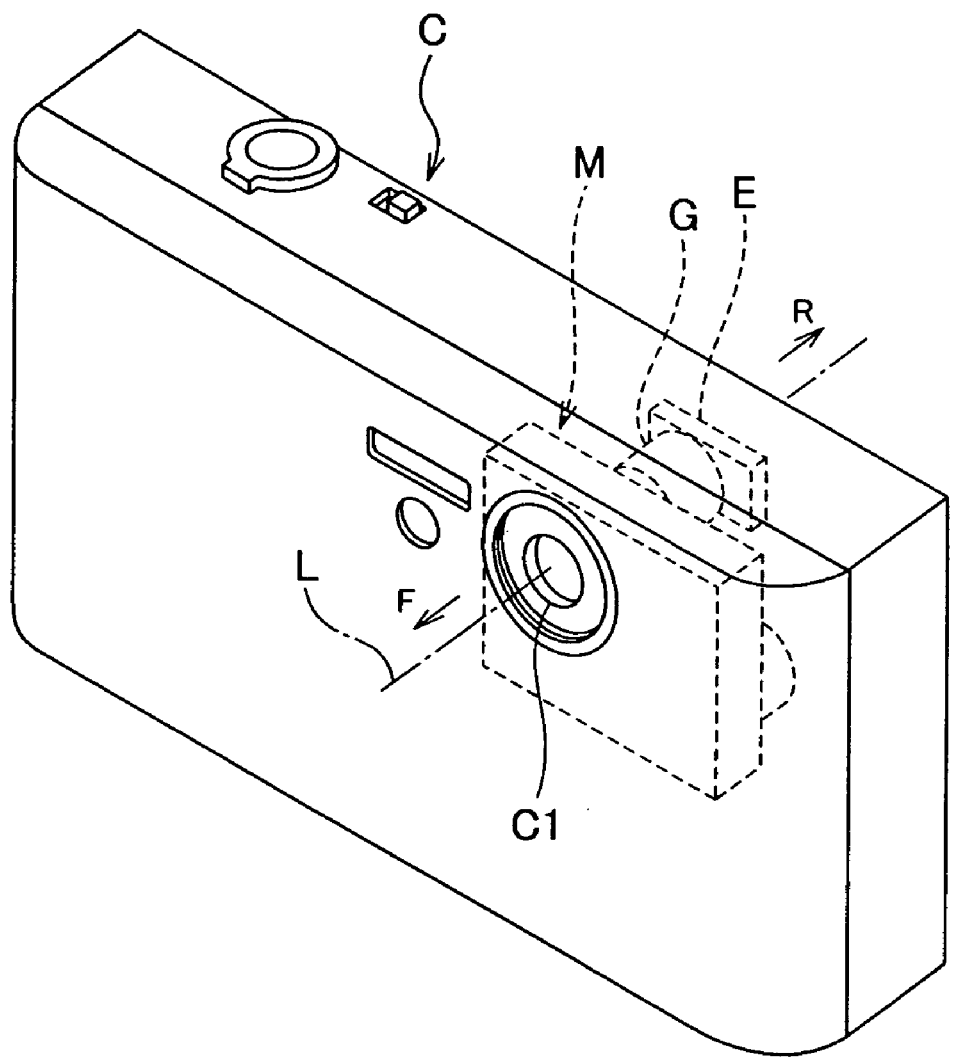
FIG. 1 is an external perspective view showing a digital camera equipped with a barrier device according to the present invention.

A digital camera C equipped with this barrier device M has a circular aperture C1 as shown in FIG. 1, and includes, in an inner space in the back of the aperture C1, the barrier device M, a lens G with an optical axis L, and an image pickup element E such as a CCD, arranged in order from front F to rear R.

Figure 2:
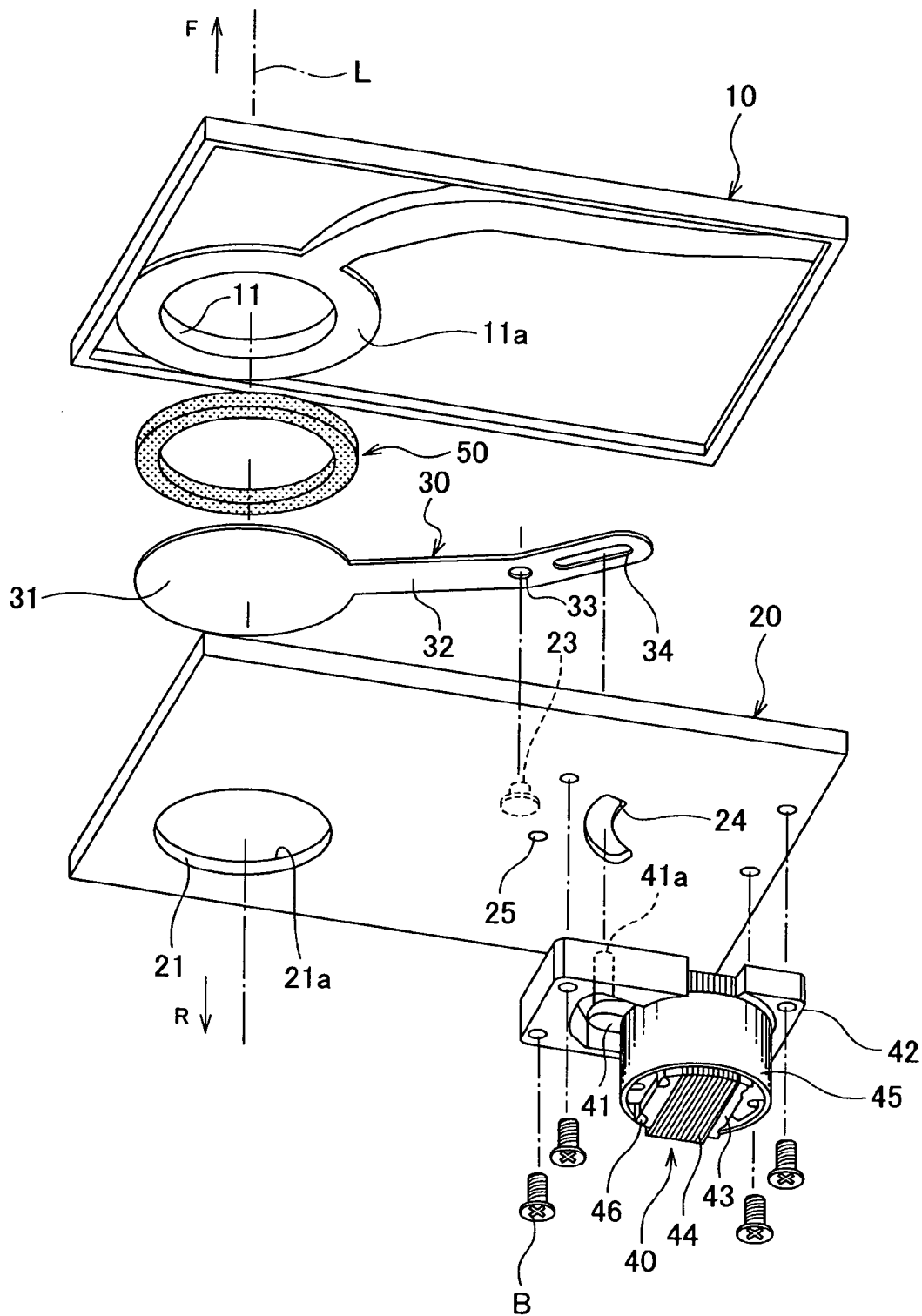
FIG. 2 is an exploded perspective view showing one embodiment of the barrier device according to the present invention.
Figure 3:
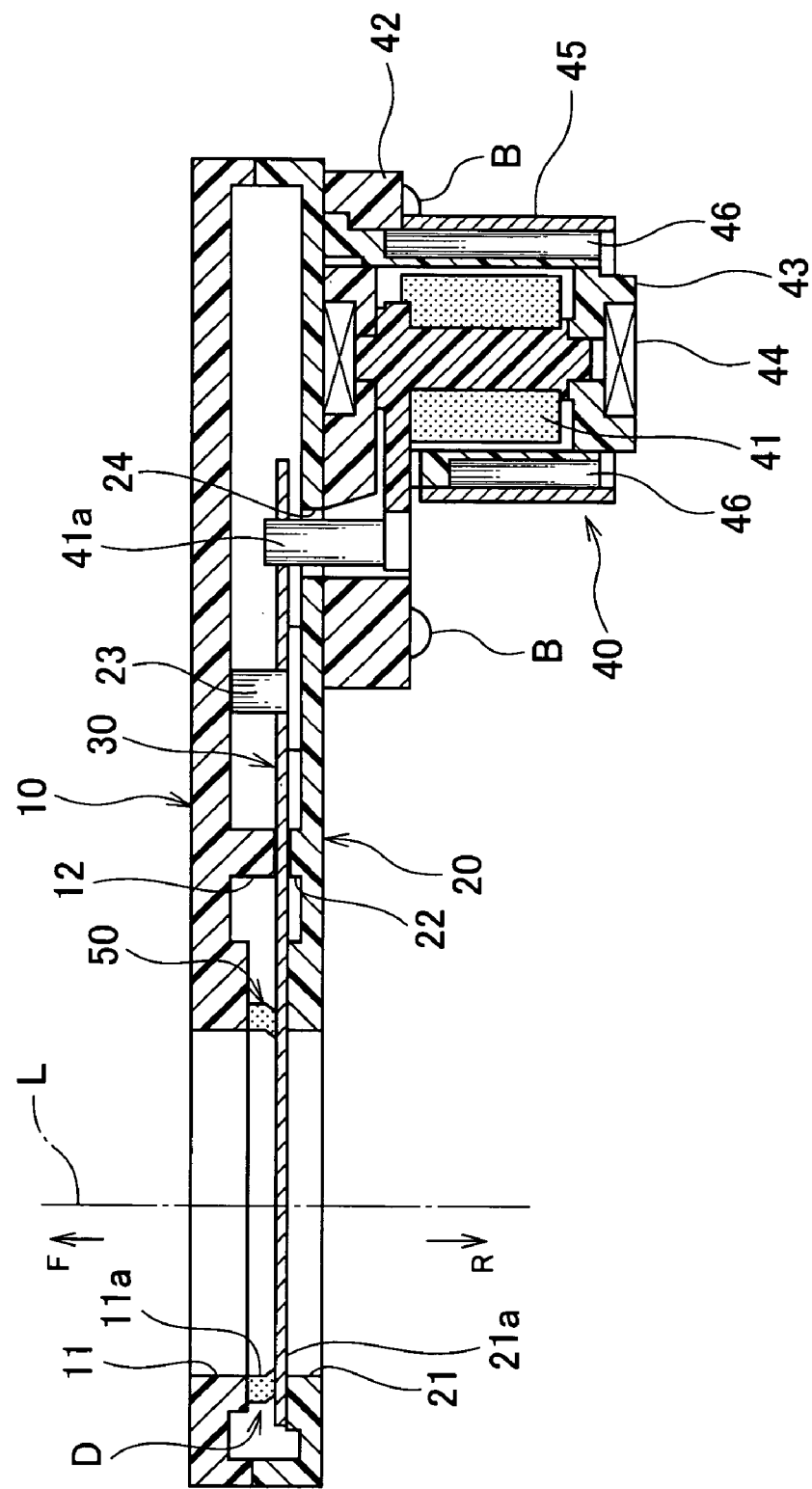
FIG. 3 is a sectional view of the barrier device shown in FIG. 2.

The barrier device M includes, as shown in FIG. 2 and FIG. 3, a cover 10 defining a circular front aperture 11, a base 20 joined with a backside of the cover 10 and defining a circular rear aperture 21, a barrier member 30 accommodated in an inner space defined by the cover 10 and the base 20, an electromagnetic actuator 40 provided to the base 20 for driving the barrier member 30 to open and close, a seal member 50 for sealing an annular gap D formed between a rear end face 11a of the front aperture 11 and a front end face 21a of the rear aperture 21, and others.

Figure 4:
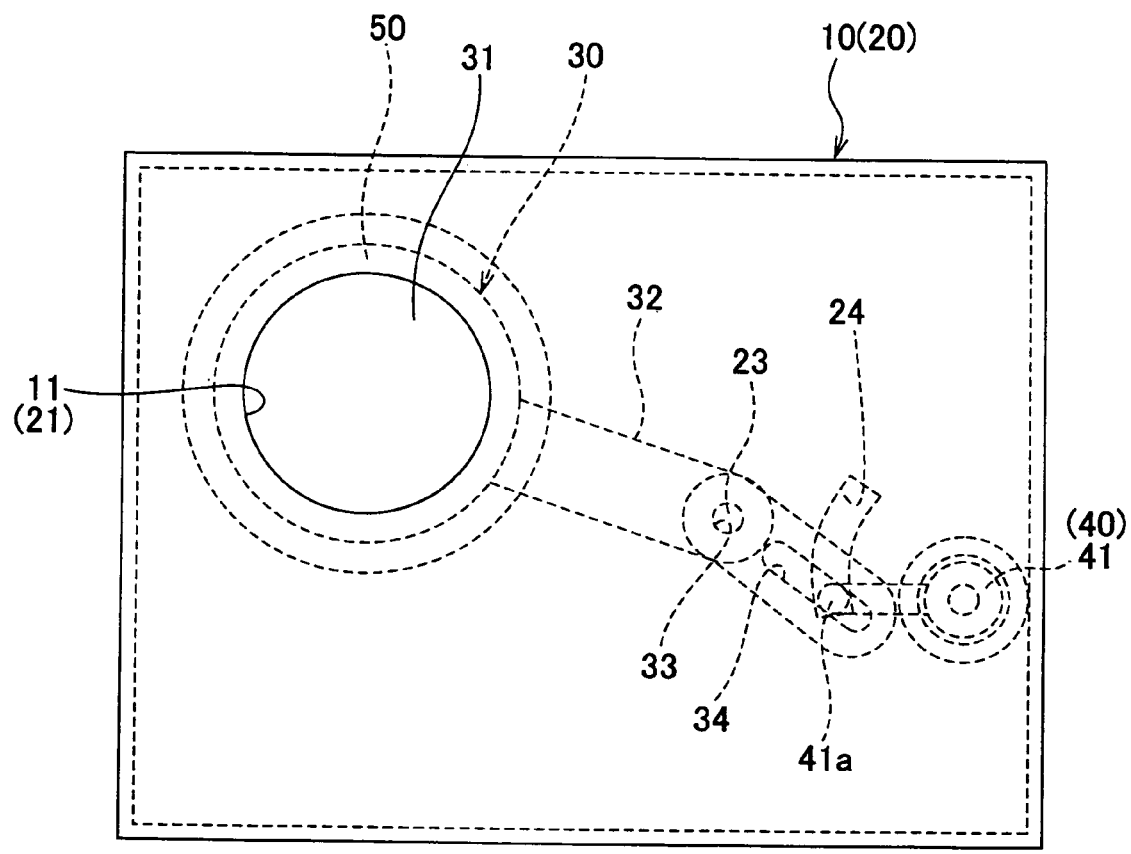
FIG. 4 is a plan view of the barrier device shown in FIG. 2 with a barrier member closing the aperture.
Figure 5:
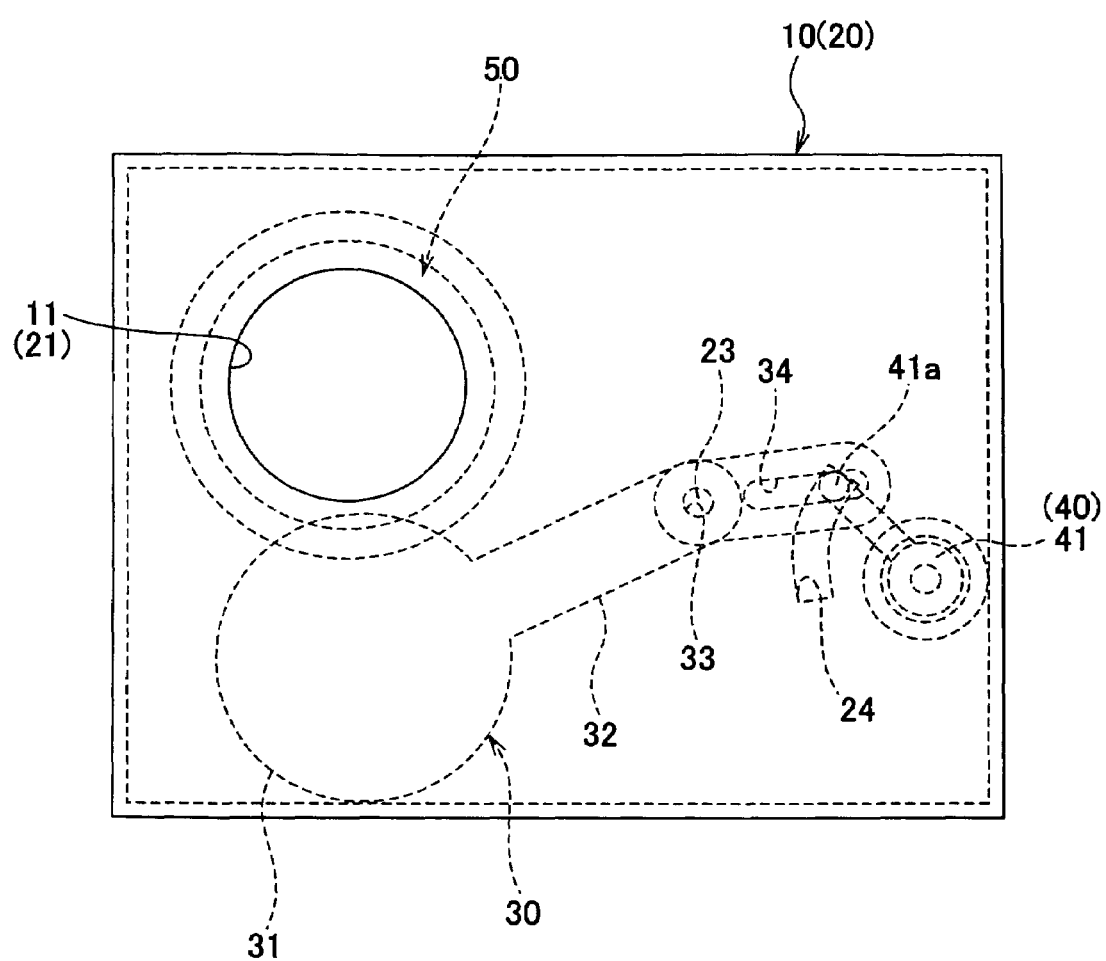
FIG. 5 is a plan view of the barrier device shown in FIG. 2 with a barrier member opening the aperture.
Figure 6:
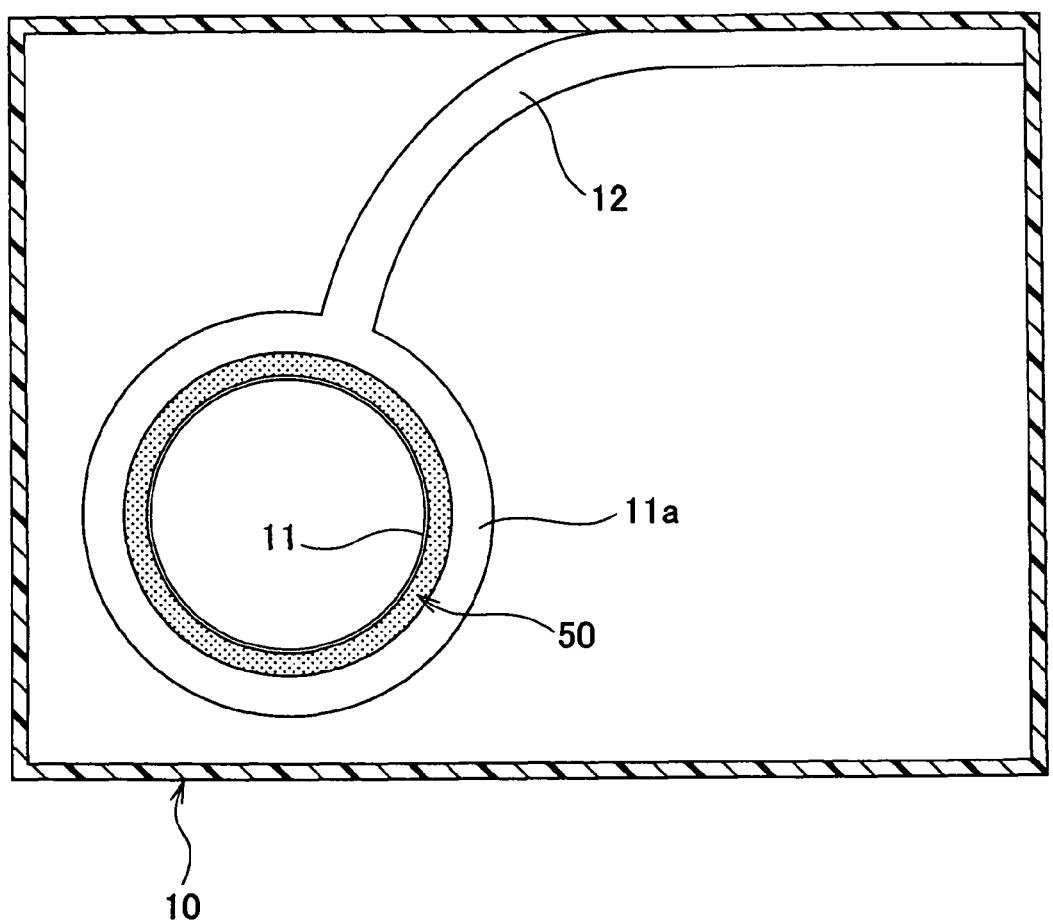
FIG. 6 is a plan view showing the interior of a cover that forms a part of the barrier device shown in FIG. 2.

The cover 10 is formed to have a generally rectangular contour as shown in FIG. 4 to FIG. 6 and includes the front aperture 11 for exposing the lens G, the rear end face 11a positioned at the rear end of the front aperture 11, a guide surface 12 for slidably guiding the barrier member 30, and others.

Figure 8:
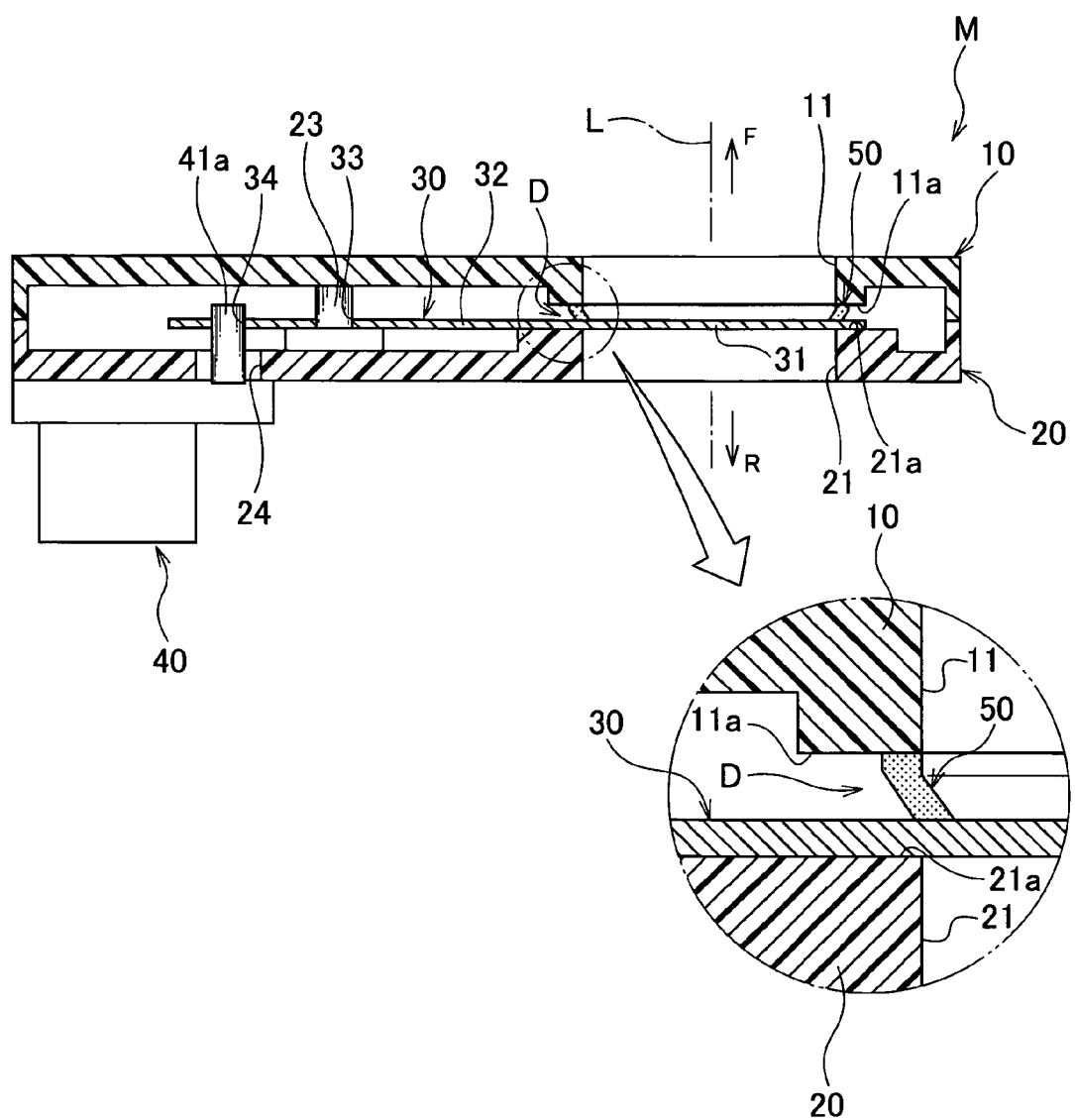
FIG. 8 is a sectional view showing the relationship between the barrier member and a seal member in the barrier device shown in FIG. 2, with the barrier member closing the aperture.
Figure 9:
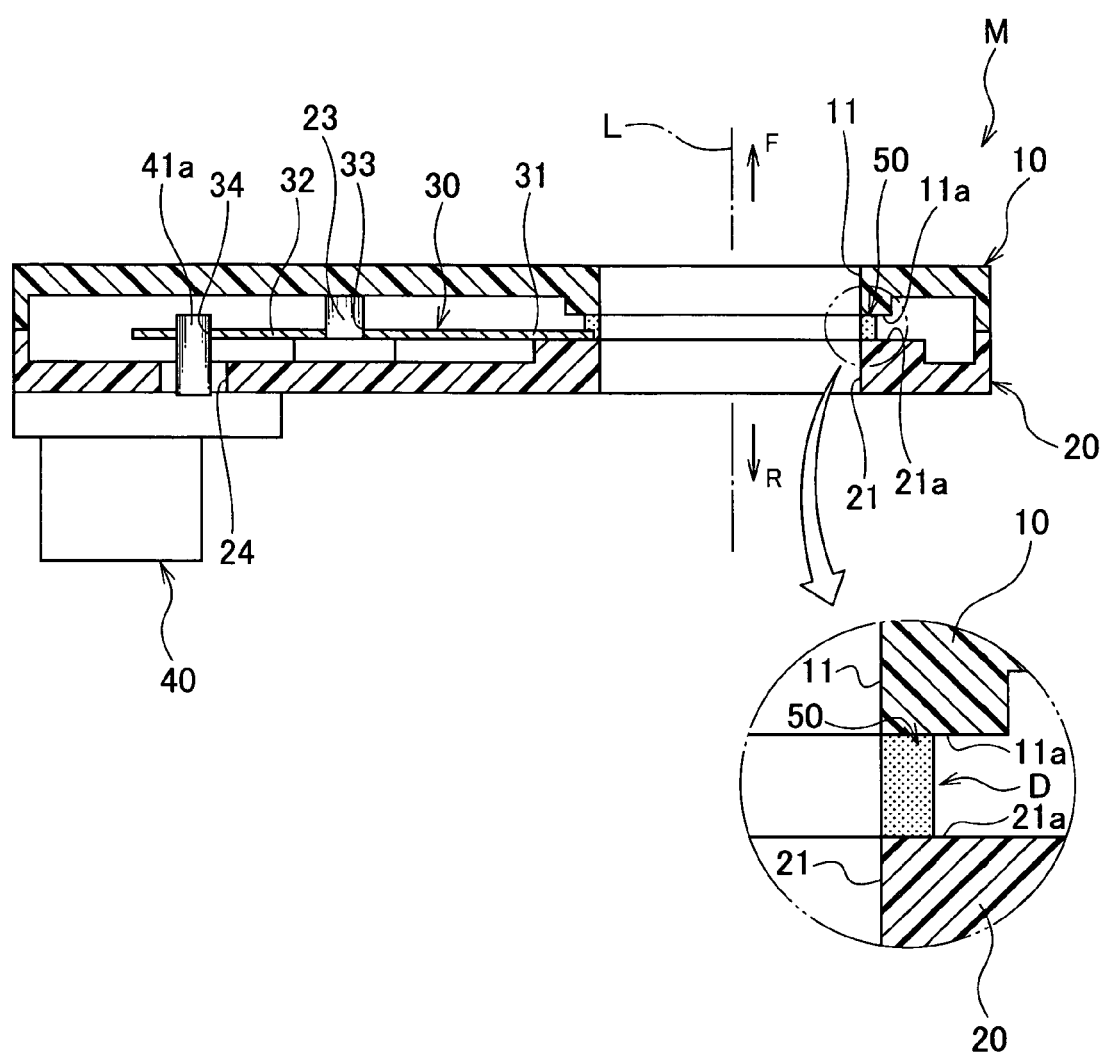
FIG. 9 is a sectional view showing the relationship between the barrier member and a seal member in the barrier device shown in FIG. 2, with the barrier member opening the aperture.

The front aperture 11 is formed cylindrical having an axial line on the optical axis L of the lens G, as shown in FIG. 8 and FIG. 9.

The rear end face 11a is formed as an annular and flat surface so as to define the gap D in cooperation with the front end face 21a of the base 20 to be described later. The seal member 50 is to be fixedly attached to the rear end face 11a.

The guide surface 12 is curved and formed flat in a region where it makes contact with an arm 32 of the barrier member 30, as shown in FIG. 6, so as to slidably guide the barrier member 30 (or the front side of its arm 32). The guide surface 12 need not be singular but can be made up of several parts.

The base 20 includes, as shown in FIG. 2, FIG. 4, FIG. 5, FIG. 7, FIG. 8, and FIG. 9, the rear aperture 21 for exposing the lens G, the front end face 21a positioned at the front end of the rear aperture 21, a guide surface 22 for slidably guiding the barrier member 30, a support shaft 23 for pivotally supporting the barrier member 30, a substantially fan-shaped through hole 24 for allowing a drive pin 41a of the electromagnetic actuator 40 to reciprocate therein, a screw hole 25 in which a screw B is tightened, and others.

The rear aperture 21 is formed cylindrical having an axial line on the optical axis L of the lens G, as shown in FIG. 8 and FIG. 9.

The front end face 21a is formed as an annular and flat surface so as to define the gap D in cooperation with the rear end face 11a of the cover 10. The front end face 21a is formed so as to be able to make closely contact with the seal member 50 as well as to slidably guide the backside of the barrier member 30.

Figure 7:
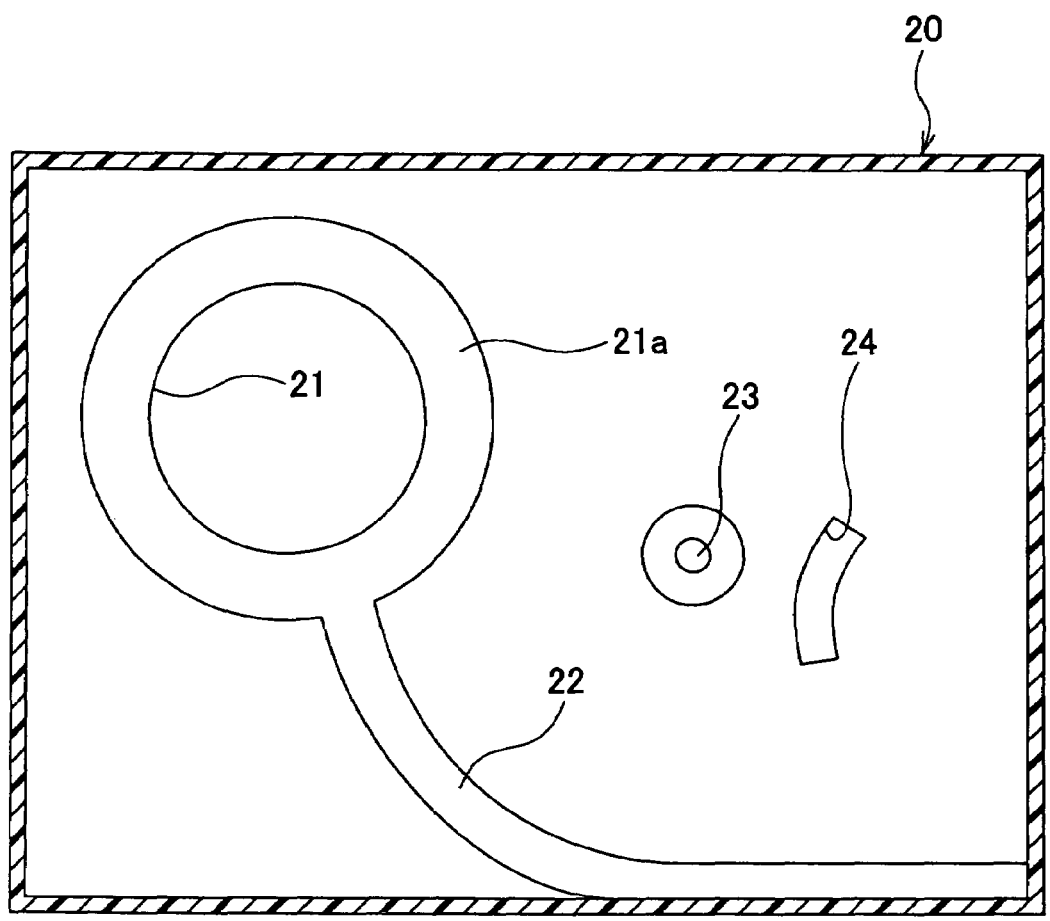
FIG. 7 is a plan view showing the interior of a base that forms a part of the barrier device shown in FIG. 2.

The guide surface 22 is formed as a curved flat surface as shown in FIG. 7, so as to slidably guide the barrier member 30 (or the backside of its arm 32). The guide surface 22 need not be singular but can be made up of several parts.

The support shaft 23 is inserted in a circular hole 33 in the barrier member 30 and formed to pivotally support the barrier member 30.

The through hole 24 is formed to allow the drive pin 41a to move in a reciprocating manner between an opened position where the barrier member 30 is retracted from the front aperture 11 and the rear aperture 21, and a closed position where the barrier member 30 faces the front aperture 11 and the rear aperture 21.

The barrier member 30 has a thin plate form as shown in FIG. 4, FIG. 5, FIG. 8, and FIG. 9 so as to pass through the gap D with some allowance, and is formed to include a circular shutter portion 31, the arm 32 extending from the shutter portion 31, the circular hole 33 and an elongate hole 34 positioned in the arm 32, and others.

The shutter portion 31 is formed to have a radial dimension that makes it capable of completely closing the front aperture 11 and the rear aperture 21. The circular hole 33 is formed so that the support shaft 23 of the base 20 is inserted therein. The elongate hole 34 is formed so that the drive pin 41a is inserted therein.

The barrier member 30 reciprocates between the closed position where it is placed in the gap D to face the front aperture 11 and the rear aperture 21 as shown in FIG. 4 and FIG. 8 and the opened position where it has pulled back from the gap D and retracted from the front aperture 11 and the rear aperture 21 as shown in FIG. 5 and FIG. 9 to perform its open/close operation.

The electromagnetic actuator 40 is secured to the backside of the base 20 with the screw B or the like as shown in FIG. 2, FIG. 3, FIG. 4, and FIG. 5, and includes a rotor 41 that rotates in a predetermined angular range, a first frame member 42 and a second frame member 43 rotatably supporting the rotor 41, an excitation coil 44 wound around the first and second frame members 42 and 43, a cylindrical yolk 45 fitted to the second frame member 43 around the coil 44, and a plurality of iron pins 46 inserted in the second frame member 43.

The rotor 41 is formed columnar and magnetized into N-pole and S-pole, and integrally includes the drive pin 41a that is inserted into the elongate hole 34 of the barrier member 30. The positioning of the rotor 41 is achieved by the drive pin 41a abutting on one end and the other end of the through hole 24 in the base 20, thereby stopping the rotor at one rotation end and the other rotation end of its rotation range.

The first frame member 42 and the second frame member 43 are connected to each other and support the rotor 41 rotatably. The first frame member 42 is secured to the base 20 with the screw B.

The coil 44 is wound around the first and second frame members 42 and 43, with the rotor 41 mounted therein.

The yolk 45 is fitted to the outer circumference of the second frame member 43, with the coil 44 wound therein.

The plurality of iron pins 46 are provided for generating magnetic retention force for stopping the rotor 41 at one rotation end and at the other rotation end.

The seal member 50 is formed to have an annular contour and a rectangular cross section by use of a brush material or sponge and the like, as shown in FIG. 6, FIG. 8, and FIG. 9. The seal member 50 is secured to the rear end face 11a of the cover 10 at one end face of the optical axis direction L so as to be able to seal the gap D over the entire circumference thereof.

That is, when the barrier member 30 retracts from the gap D to be in its opened position, as shown in FIG. 5 and FIG. 9, the seal member 50 seals the gap D with a part thereof being in contact with the barrier member 30 (or an outer edge region thereof). On the other hand, as shown in FIG. 4 and FIG. 8, when the barrier member 30 enters the gap D to be in its closed position, the seal member 50 deforms by an amount corresponding to the thickness of the barrier member 30 and makes closely contact with the surface (front face) of the barrier member 30 to seal the gap D.

The seal member 50 is thus capable of sealing the gap D over its entire circumference as well as deformable such as to allow the open/close operation of the barrier member 30, thereby ensuring that the barrier member 30 can smoothly open and close, and that dirt, dust, moisture or the like is prevented from penetrating through the gap D (clearance) between the front aperture 11 and the rear aperture 21.

In particular, since a part of the seal member 50 is in contact with the barrier member 30 when the barrier member 30 is in its opened position, the barrier member 30 is prevented from colliding and getting stuck with the seal member 50 when moving toward its closed position. This enables the barrier member 30 to smoothly move toward the closed position and to reliably seal the gap D.

Forming the seal member 50 from a brush material or sponge makes the resisting force when making contact with the barrier member 30 or when deformed by the barrier member 30 as small as possible so as to reliably seal the gap D, as well as allows the seal member 50 to easily deform to receive the barrier member 30 when the barrier member 30 enters the gap D. This enhances the sealing effect further, and enables even smoother open/close operation of the barrier member 30.

Moreover, the seal member 50 is simply an annular component secured to the rear end face 11a of the cover 10, and therefore simplification of the structure and a reduction in cost are achieved. Note, the seal member 50 can be secured to the front end face 21a of the base 20.

Next, an operation of the above-mentioned device will be described with reference to FIG. 4, FIG. 5, FIG. 8, and FIG. 9. First, when the digital camera C is not in use, the electromagnetic actuator 40 is powered in one direction (the rotor 41 is rotated in one direction), so that the barrier member 30 enters the gap D while deforming the seal member 50 as shown in FIG. 4 and FIG. 8, to be positioned in its closed position facing the front aperture 11 and the rear aperture 21.

In this closed state, the seal member 50 deforms so as to be capable of resilient restoration and makes closely contact with the surface (front face) of the barrier member 30 to completely seal the gap D. Therefore, any dirt, dust, moisture or the like that may enter from outside through the front aperture 11 is completely shut out by the seal member 50 and prevented from penetrating through the gap D into the inner space defined by the base 20 and the cover 10.

On the other hand, when the digital camera C is in use, the electromagnetic actuator 40 is powered in the other direction (the rotor 41 is rotated in the other direction), so that the barrier member 30 retracts from the gap D to be positioned in its opened position where it opens the front aperture 11 and rear aperture 21 as shown in FIG. 5 and FIG. 9.

In this opened state, the seal member 50 fully seals the gap D with a part thereof being in contact with the barrier member 30. Therefore, any dirt, dust, moisture or the like that may enter from outside through the front aperture 11 is completely shut out by the seal member 50 and prevented from penetrating through the gap D into the inner space. This prevents the electric wiring and electronic components or the like of the electromagnetic actuator 40 from becoming wet by moisture penetrating through the inner space defined by the cover 10 and the base 20, and ensures desired functions.

Since the seal member 50 is in contact with the barrier member 30 with a part thereof when the barrier member 30 is in the opened position, the barrier member 30 is prevented from colliding and getting stuck with the seal member 50 when moving towards the closed position. Thus smooth movement of the barrier member 30 towards the closed position is made possible while the gap D is fully sealed.

Figure 10:
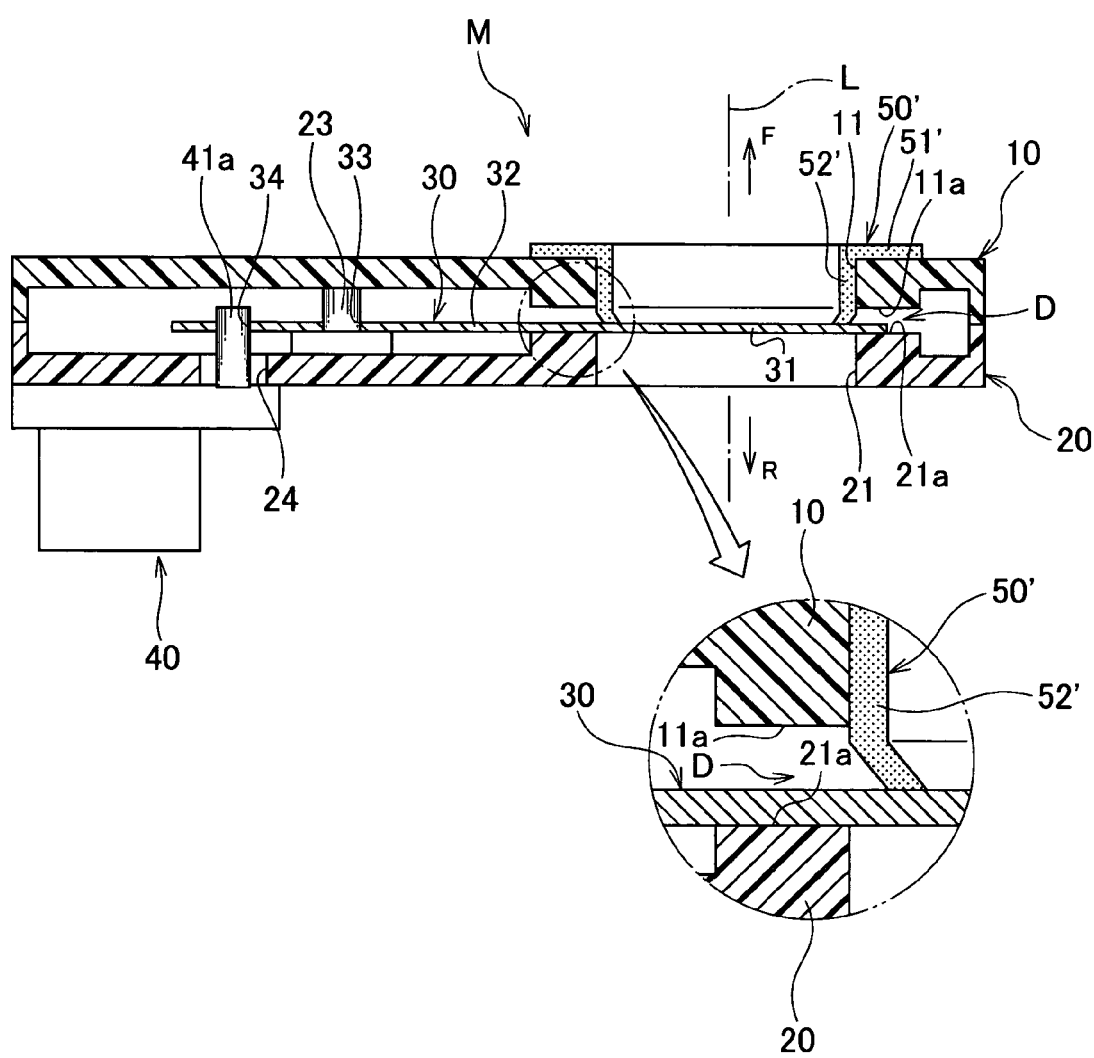
FIG. 10 is a sectional view showing the relationship between a barrier member and a seal member in a second embodiment of the barrier device according to the present invention, with the barrier member closing the aperture.
Figure 11:
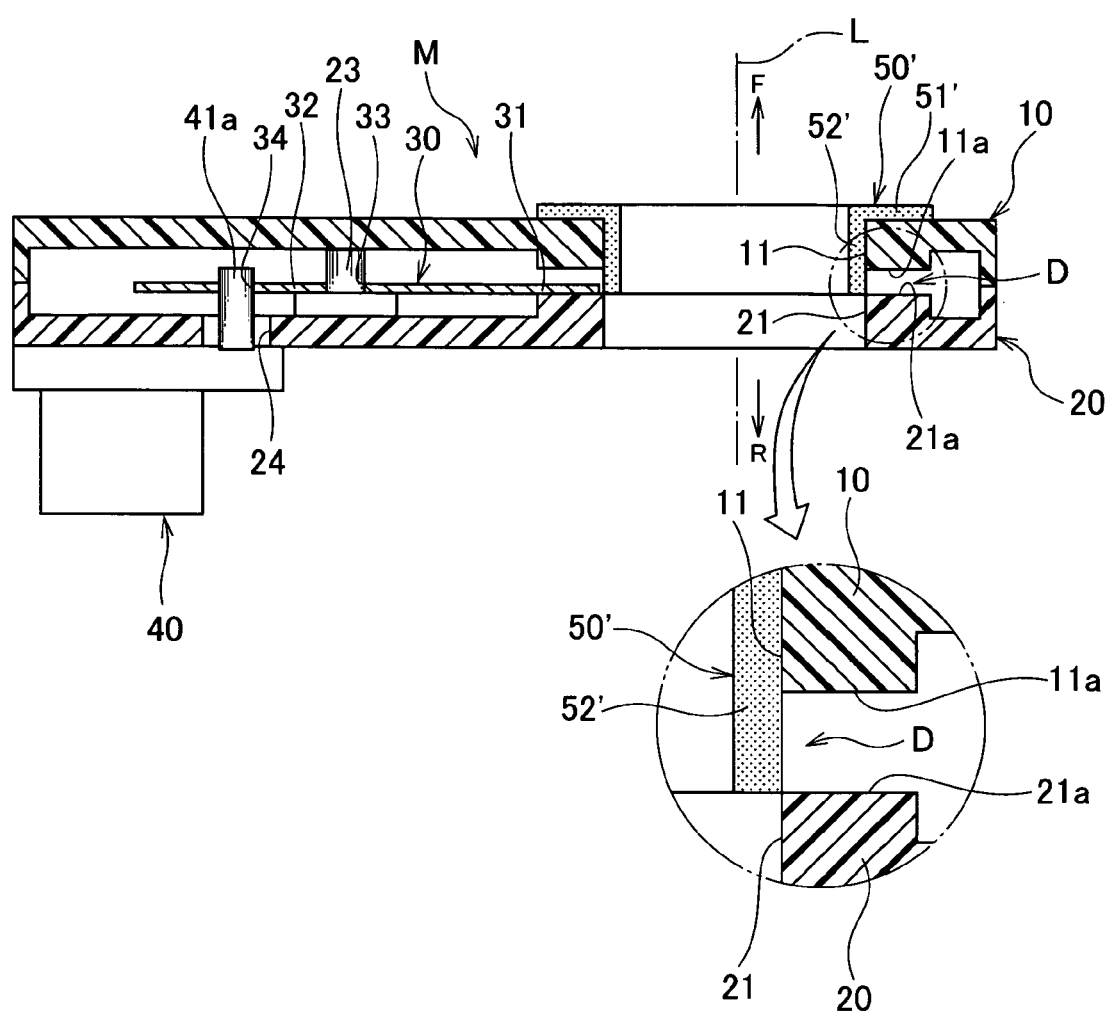
FIG. 11 is a sectional view showing the relationship between a barrier member and a seal member in a second embodiment of the barrier device according to the present invention, with the barrier member opening the aperture.

FIG. 10 and FIG. 11 show a second embodiment of the barrier device according to the present invention. This embodiment is substantially identical to the foregoing embodiment except that the shape of the seal member is changed, and therefore same elements are given the same reference numerals and description thereof will be omitted.

That is, this barrier device M includes a cover 10, a base 20, a barrier member 30, an electromagnetic actuator 40, and a seal member 50'.

The seal member 50' is formed by use of a brush material or sponge and the like to integrally include a circular flange 51' secured to the front face of the cover 10, and a tubular portion 52' extending from the flange 51' along the inner circumferential face of the front aperture 11 to a position where it seals the gap D.

That is, when the barrier member 30 enters the gap D to be in the closed position, as shown in FIG. 10, a distal end region of the tubular portion 52' of the seal member 50' deforms by an amount corresponding to the thickness of the barrier member 30 and seals the gap D while being in closely contact with the surface (front face) of the barrier member 30. On the other hand, when the barrier member 30 retracts from the gap D to be in the opened position as shown in FIG. 11, the seal member 50' seals the gap D with a part thereof (partly deformed) being in contact with the barrier member 30 similarly to the case shown in FIG. 5.

The seal member 50' is thus capable of sealing the gap D over its entire circumference as well as deformable such as to allow the open/close operation of the barrier member 30, thereby ensuring that the barrier member 30 can smoothly open and close, and that dirt, dust, moisture or the like is prevented from penetrating through the gap D (clearance) between the front aperture 11 and the rear aperture 21.

In particular, since a part of the seal member 50' is in contact with the barrier member 30 when the barrier member 30 is in its opened position, the barrier member 30 is prevented from colliding and getting stuck with the seal member 50' when moving toward its closed position. This enables the barrier member 30 to smoothly move toward the closed position and to reliably seal the gap D.

Forming the seal member 50' from a brush material or sponge makes the resisting force when making contact with the barrier member 30 or when deformed by the barrier member 30 as small as possible so as to reliably seal the gap D, as well as allows the seal member 50' to easily deform to receive the barrier member 30 when the barrier member 30 enters the gap D. This enhances the sealing effect further, and enables even smoother open/close operation of the barrier member 30.

Moreover, the seal member 50' is simply a cylindrical component fixedly fitted to the inner circumferential face of the front aperture 11 in the cover 10 and arranged to seal the gap D, and therefore simplification of the structure and a reduction in cost are achieved, and the dust/moisture protection effect is further enhanced.

Figure 12:
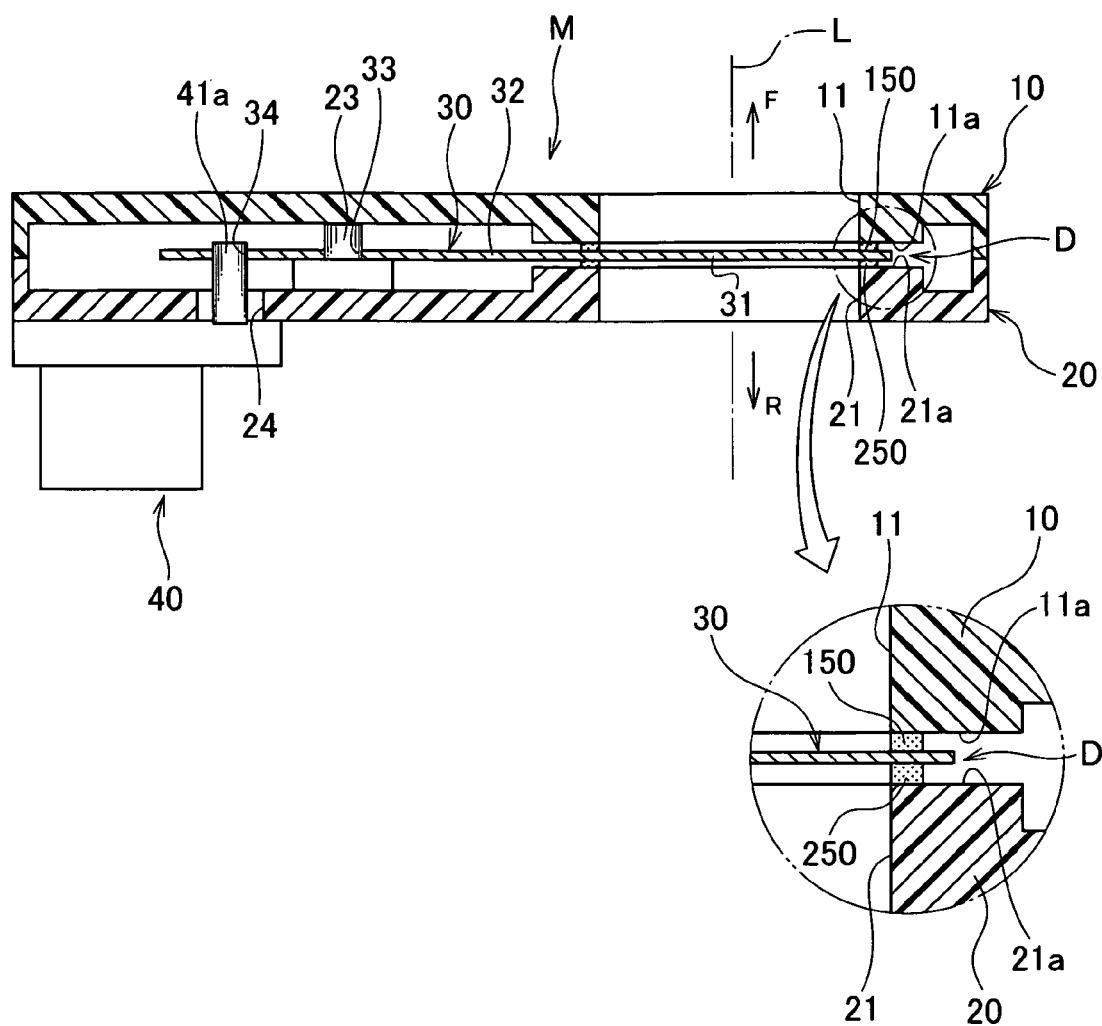
FIG. 12 is a sectional view showing the relationship between a barrier member and a seal member in a third embodiment of the barrier device according to the present invention, with the barrier member closing the aperture.
Figure 13:
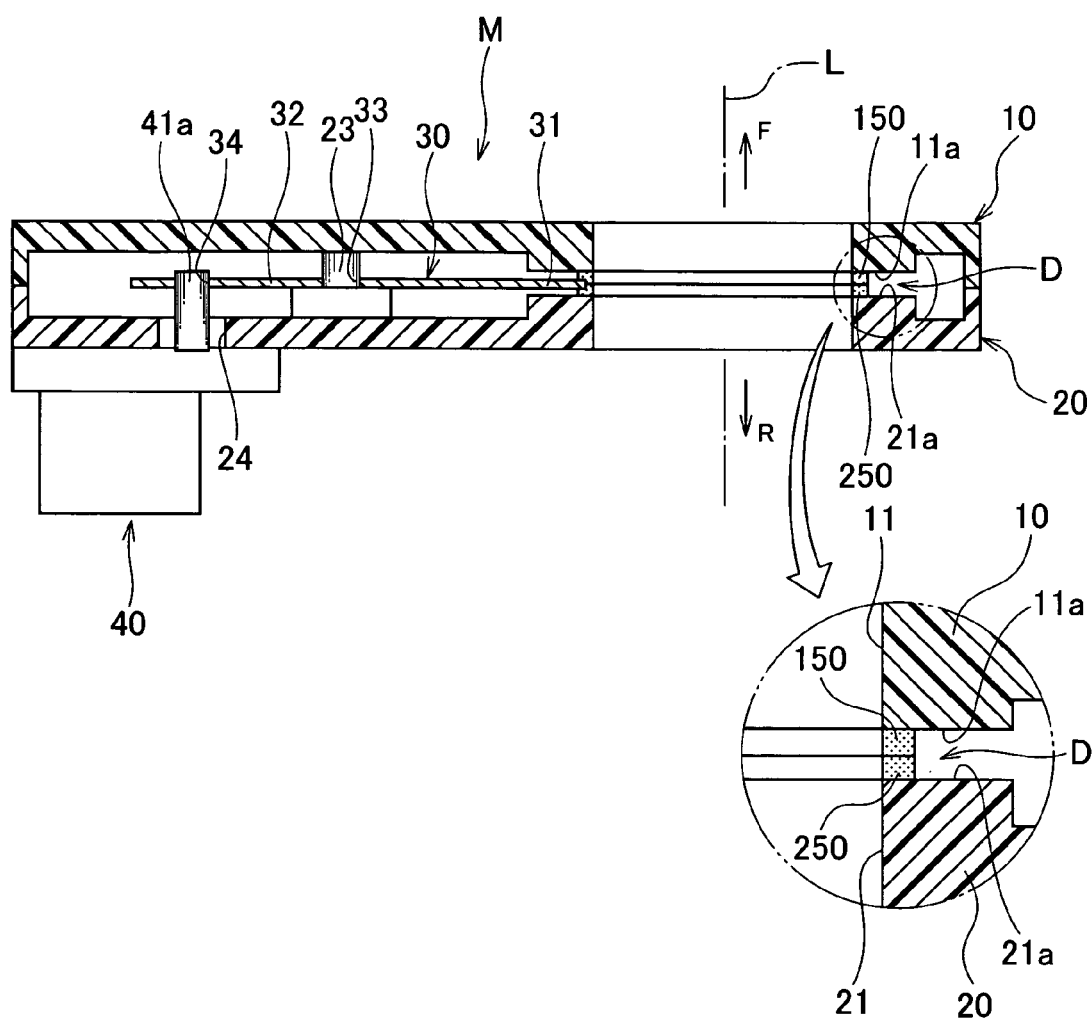
FIG. 13 is a sectional view showing the relationship between a barrier member and a seal member in a third embodiment of the barrier device according to the present invention, with the barrier member opening the aperture.

FIG. 12 and FIG. 13 show a third embodiment of the barrier device according to the present invention. This embodiment is substantially identical to the foregoing embodiment except that the shape of the seal member is changed, and therefore same elements are given the same reference numerals and description thereof will be omitted.

That is, this barrier device M includes a cover 10, a base 20, a barrier member 30, an electromagnetic actuator 40, and a front seal member 150 and a rear seal member 250 as a seal member.

As shown in FIG. 12 and FIG. 13, the front seal member 150 is formed annular by use of a brush material or sponge and the like to extend a length of substantially a half of the gap D in the optical axis direction L, and is secured to the rear end face 11a of the front aperture 11.

The rear seal member 250, as shown in FIG. 12 and FIG. 13, is formed annular by use of a brush material or sponge and the like to extend a length of substantially a half of the gap D in the optical axis direction L, and is secured to the front end face 21a of the rear aperture 21 such that it faces opposite and makes closely contact with the front seal member 150.

That is, the front seal member 150 and the rear seal member 250 are arranged coaxially along the axial line direction (optical axis direction L) of the front aperture 11 and the rear aperture 21 relative to the gap D so as to be in closely contact with and opposite each other.

When the barrier member 30 enters the gap D to be in the closed position, as shown in FIG. 12, the front seal member 150 and the rear seal member 250 respectively deform so as to allow movement of the barrier member 30 and respectively make closely contact with both sides of the barrier member 30 to seal the gap D. On the other hand, when the barrier member 30 retracts from the gap D to be in the opened position, as shown in FIG. 13, the front seal member 150 and the rear seal member 250 seal the gap D with a part thereof (partly deformed) being in contact with the barrier member 30 similarly to the case described in the foregoing.

The front seal member 150 and the rear seal member 250 are thus capable of sealing the gap D over its entire circumference as well as deformable such as to allow the open/close operation of the barrier member 30, thereby ensuring that the barrier member 30 can smoothly open and close, and that dirt, dust, moisture or the like is prevented from penetrating through the gap D (clearance) between the front aperture 11 and the rear aperture 21.

In particular, since parts of the front seal member 150 and the rear seal member 250 are in contact with the barrier member 30 when the barrier member 30 is in its opened position, the barrier member 30 is prevented from colliding and getting stuck with the front seal member 150 or the rear seal member 250 when moving toward its closed position. This enables the barrier member 30 to smoothly move toward the closed position and to reliably seal the gap D.

Forming the front seal member 150 and the rear seal member 250 from a brush material or sponge makes the resisting force when making contact with the barrier member 30 or when deformed by the barrier member 30 as small as possible so as to reliably seal the gap D, as well as allows the seal members to easily deform to receive the barrier member 30 when the barrier member 30 enters the gap D. This enhances the sealing effect further, and enables even smoother open/close operation of the barrier member 30. Moreover, the seal members can deform more easily than a single seal member, thereby allowing the barrier member 30 to perform the open/close operation more smoothly. The front seal member 150 and the rear seal member 250 can also have higher durability.

Figure 14A:
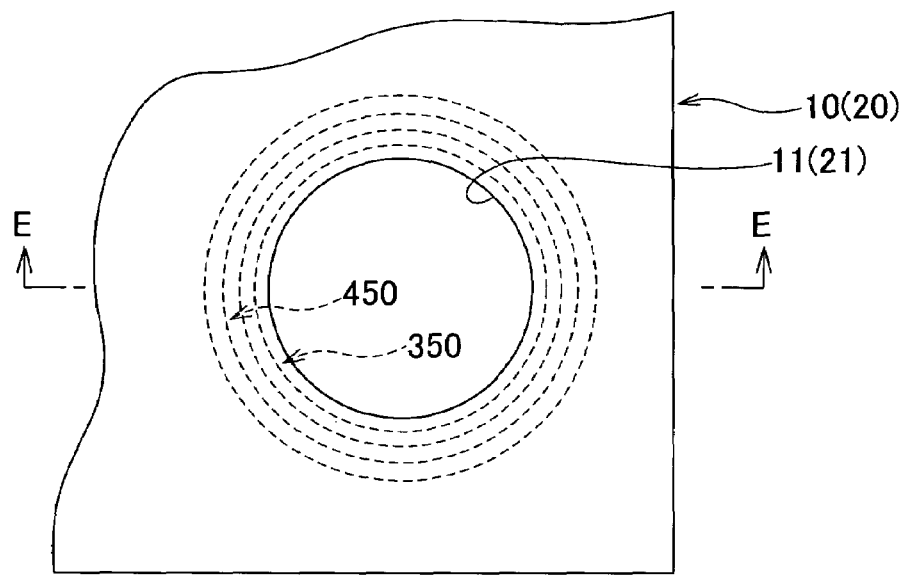
FIG. 14A and FIG. 14B illustrate a fourth embodiment of the barrier device according to the present invention, FIG. 14A being a partial plan view of a state with a barrier member opening the aperture and FIG. 14B being a partial sectional view across the line E-E in FIG. 14A.
Figure 14B:
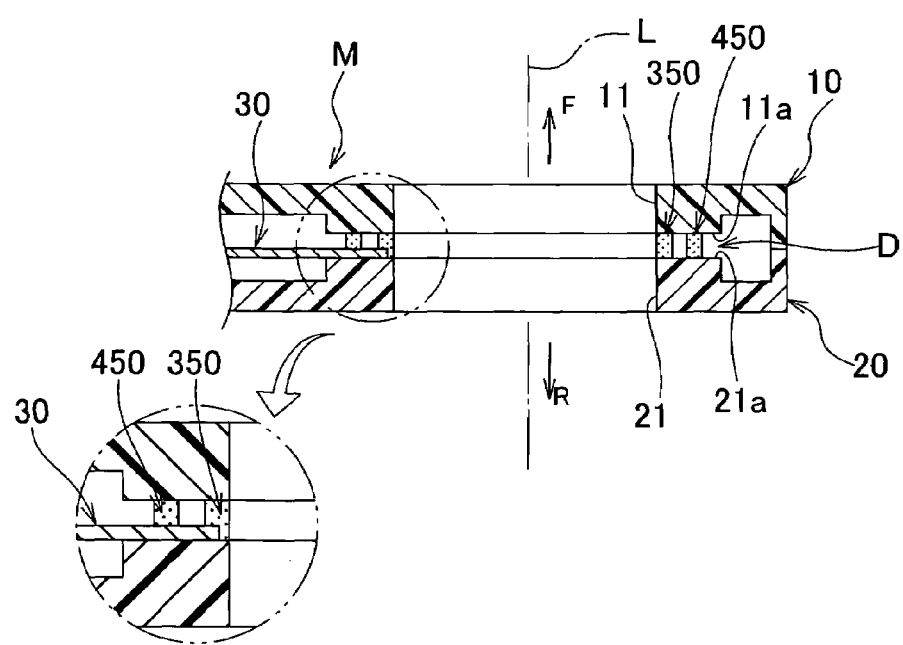

FIG. 14A and FIG. 14B show a fourth embodiment of the barrier device according to the present invention. This embodiment is substantially identical to the foregoing embodiment except that the shape of the seal member is changed, and therefore same elements are given the same reference numerals and description thereof will be omitted.

That is, this barrier device M includes a cover 10, a base 20, a barrier member 30, an electromagnetic actuator 40, and an inner seal member 350 and an outer seal member 450 as a seal member.

As shown in FIG. 14A and FIG. 14B, the inner seal member 350 is formed annular by use of a brush material or sponge and the like, arranged between the rear end face 11a of the front aperture 11 and the front end face 21a of the rear aperture 21, and is secured to the rear end face 11a.

The outer seal member 450, as shown in FIG. 14A and FIG. 14B, is formed annular by use of a brush material or sponge and the like, arranged between the rear end face 11a of the front aperture 11 and the front end face 21a of the rear aperture 21, spaced apart from the inner seal member 350 on the radially outer side thereof, and is secured to the rear end face 11a.

That is, the inner seal member 350 and the outer seal member 450 are arranged concentrically in the radial direction of the front aperture 11 and the rear aperture 21 relative to the gap D. When the barrier member 30 enters the gap D to be in the closed position, the inner seal member 350 and the outer seal member 450 respectively deform by an amount corresponding to the thickness of the barrier member 30 so as to allow movement of the barrier member 30 and respectively make closely contact with the surface (front face) of the barrier member 30 to seal the gap D. On the other hand, when the barrier member 30 retracts from the gap D to be in the opened position, as shown in FIG. 14B, the inner seal member 350 and the outer seal member 450 seal the gap D with a part thereof (partly deformed) being in contact with the barrier member 30 similarly to the case described in the foregoing.

The inner seal member 350 and the outer seal member 450 are thus capable of sealing the gap D over its entire circumference as well as deformable such as to allow the open/close operation of the barrier member 30, thereby ensuring that the barrier member 30 can smoothly open and close, and that dirt, dust, moisture or the like is prevented from penetrating through the gap D (clearance) between the front aperture 11 and the rear aperture 21.

In particular, since parts of the inner seal member 350 and the outer seal member 450 are in contact with the barrier member 30 when the barrier member 30 is in its opened position, the barrier member 30 is prevented from colliding and getting stuck with the inner seal member 350 or the outer seal member 450 when moving toward its closed position. This enables the barrier member 30 to smoothly move toward the closed position and to reliably seal the gap D.

Forming the inner seal member 350 and the outer seal member 450 from a brush material or sponge makes the resisting force when making contact with the barrier member 30 or when deformed by the barrier member 30 as small as possible so as to reliably seal the gap D, as well as allows the seal members to easily deform to receive the barrier member 30 when the barrier member 30 enters the gap D. This enhances the sealing effect further, and enables even smoother open/close operation of the barrier member 30. Moreover, the two radially arranged seal members (the inner seal member 350 and the outer seal member 450) provide a sealing effect similar to a "labyrinth" effect and increase the sealing effect as compared with a single seal member, thereby preventing penetration of dirt, dust, moisture or the like more reliably.

While both of the inner seal member 350 and the outer seal member 450 in the example shown here are secured to the rear end face 11a, the invention is not limited to this, and both of them can be secured to the front end face 21a, or, one of them can be secured to the rear end face 11a while the other is secured to the front end face 21a.

While the barrier member 30 shown in the above embodiments is a single barrier member, the invention is not limited to this and a barrier member made up of two parts can be adopted.

The front aperture 11 and the rear aperture 21 shown in the above embodiments are cylindrical, and the seal members 50, 50', 150, 250, 350, and 450 are annular or cylindrical. If, however, the front aperture and the rear aperture are elliptic or rectangular, then an elliptic or rectangular annular seal member can be adopted, as long as it can seal the entire circumference of the gap D.

Seal members consisting of a front seal member 150 and a rear seal member 250 arranged along the optical axis direction L, or of an inner seal member 350 and an outer seal member 450 radially spaced apart from each other, have been shown in the above embodiments. An alternative structure combining these arrangements can also be adopted, i.e., plural (for example, two) pairs of front seal member and rear seal member can be arranged radially spaced apart from each other.

Figure 15:
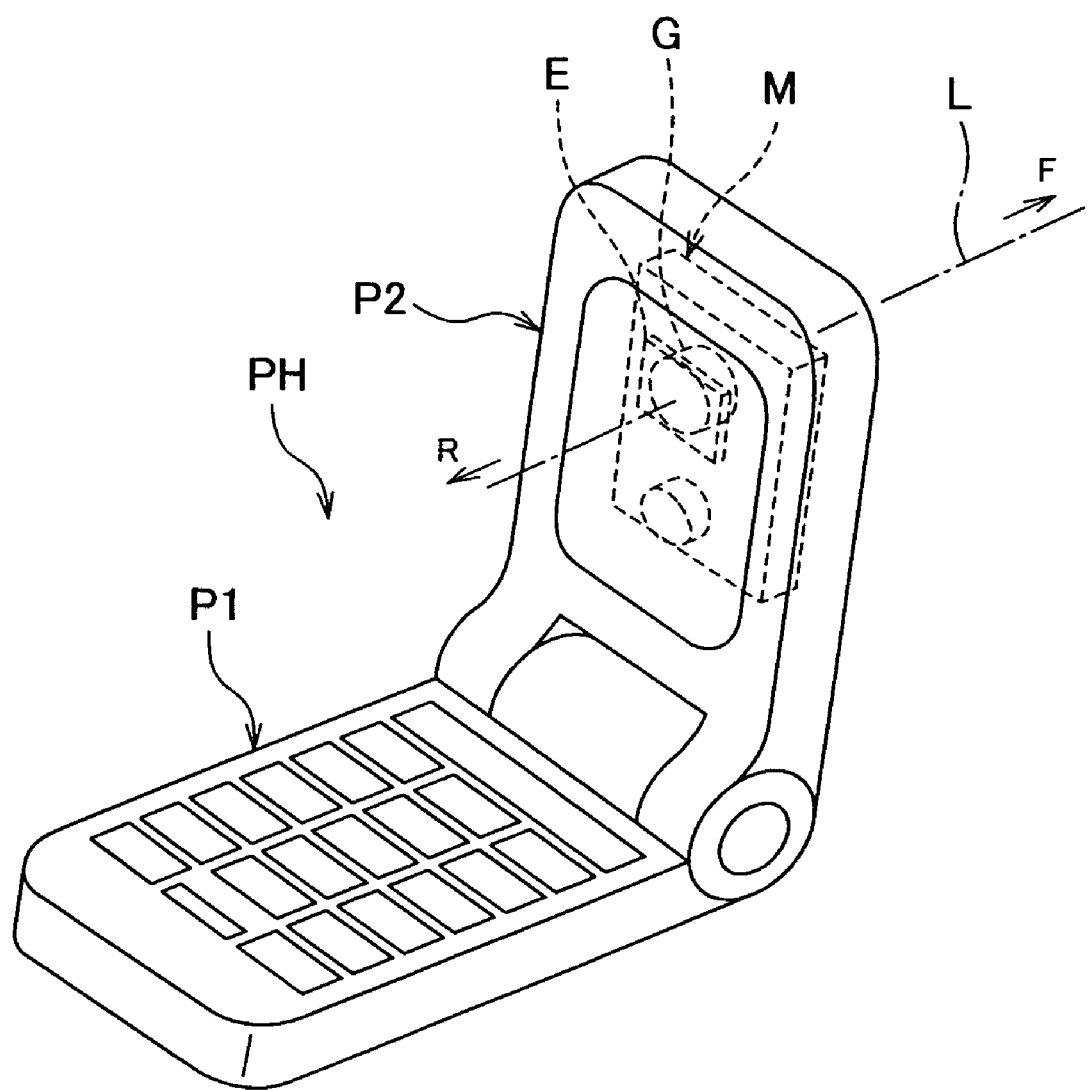
FIG. 15 is a perspective view of a mobile phone showing a case in which the barrier device according to the present invention is mounted in a mobile phone.

FIG. 15 shows an embodiment in which the barrier device M according to the present invention is mounted in a mobile phone PH.

The mobile phone PH includes, as shown in FIG. 15, a main body P1 on which operation buttons and the like are arranged, and a lid member P2 connected to the main body P1 with a hinge so as to freely open and close, with a liquid crystal display panel or the like disposed thereon.

The lid member P2 accommodates a barrier device M similar to those described above, a lens G, and an image pickup element E or the like arranged in order from front of the optical axis direction L, in back of an aperture (not shown) provided for photographing.

In this embodiment, too, similarly to the foregoing, while achieving simplification of the structure and a reduction in cost, the barrier member is allowed to move smoothly, and also, dirt, dust, moisture or the like is prevented from penetrating through the aperture in the lid member P2, through a clearance (gap D) in the aperture defined by the cover and the base.

Figure 16:
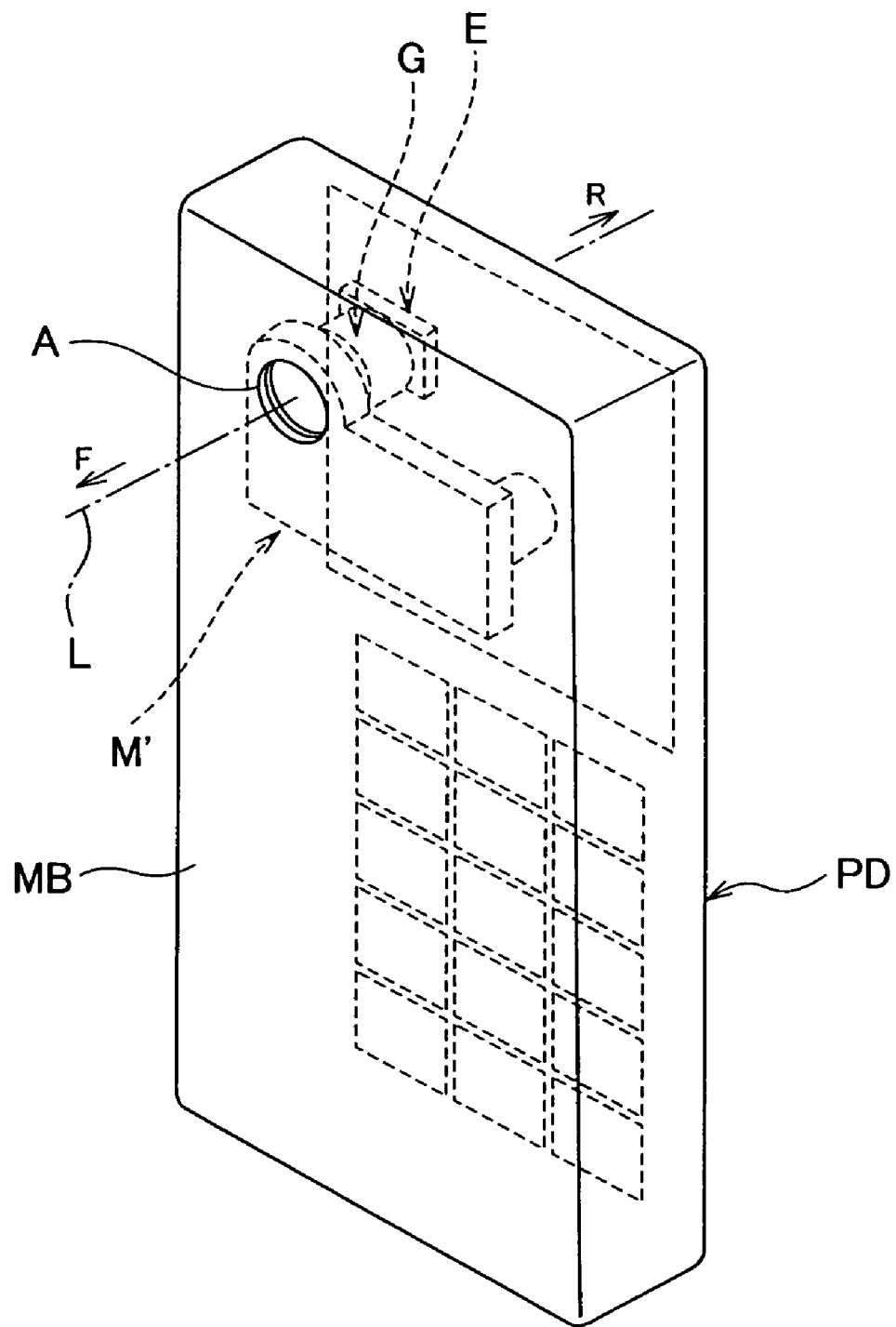
FIG. 16 is a perspective view of a portable information terminal device showing a case in which the barrier device according to the present invention is mounted in a portable information terminal device.

FIG. 16 shows an embodiment in which the barrier device M according to the present invention is mounted in a portable information terminal device PD.

The portable information terminal device PD includes, as shown in FIG. 16, a case MB on which operation buttons and a liquid crystal display panel or the like are arranged, and an aperture A for imaging purposes is provided.

The case MB accommodates a barrier device M', a lens G, and an image pickup element E or the like arranged in order from front of the optical axis direction L, in back of the aperture A.

The barrier device M' has a similar structure as that of the embodiments described above, except that the cover and the base have a different contour.

In this embodiment, too, similarly to the foregoing, while achieving simplification of the structure and a reduction in cost, the barrier member is allowed to move smoothly, and also, dirt, dust, moisture or the like is prevented from penetrating through the aperture A in the case MB, through a clearance (gap D) in the aperture defined by the cover and the base.

As described above, the barrier device of the present invention can reliably prevent penetration of dirt, dust, moisture or the like through the gap (clearance) in the aperture while achieving simplification of the structure and a reduction in cost. Therefore it is obviously applicable to portable digital cameras including not only a lens but also an ND filter, ND filter blades, shutter blades, aperture blades, and others, and to camera units mounted in mobile phones or portable information terminal devices, and is also useful for other types of cameras as a measure for preventing dust, moisture or the like.

What is claimed is:

1. A barrier device comprising:
   a cover defining a front aperture;
   a base joined with a backside of the cover and defining a rear aperture;
   an annular gap formed between a rear end face of the front aperture and a front end face of the rear aperture;
   a barrier member movably mounted through the gap between a closed position where the barrier member faces the front aperture and the rear aperture and an opened position where the barrier member is retracted from the front aperture and the rear aperture; and
   a seal member for sealing the gap, the sealing member being provided over an entire circumference of the gap and formed such that when the barrier member is in the opened position, the seal member seals the gap with a part thereof being in contact with the barrier member, and when the barrier member is in the closed position, the seal member deforms to make contact with a surface of the barrier member.

2. A barrier device according to claim 1, wherein the seal member is formed annular, arranged between the rear end face of the front aperture and the front end face of the rear aperture, and secured to either one of the rear end face and the front end face.

3. A barrier device according to claim 1, wherein the seal member is formed tubular extending along an inner circumferential face of the front aperture to a position where the seal member seals the gap.

4. A barrier device according to claim 1, wherein the seal member includes a front seal member formed annular and secured to the rear end face of the front aperture, and a rear seal member formed annular so as to face opposite and in closely contact with the front seal member and secured to the front end face of the rear aperture.

5. A barrier device according to claim 1, wherein the seal member includes an inner seal member formed annular, arranged between the rear end face of the front aperture and the front end face of the rear aperture, and secured to either one of the rear end face and the front end face, and an outer seal-member formed annular, arranged between the rear end face of the front aperture and the front end face of the rear aperture and spaced apart from the inner seal member on a radially outer side thereof, and secured to either one of the rear end face and the front end face.

6. A barrier device according to claim 1, wherein the seal member is formed of one of a brush material and sponge.

7. A barrier device according to claim 1, wherein the barrier member is swingably provided relative to the base, the base is provided with an electromagnetic actuator for driving the barrier member to open and close.

* * * * *